INVENTORS:
HANS PFEIFFER
ERICH KRAFFT

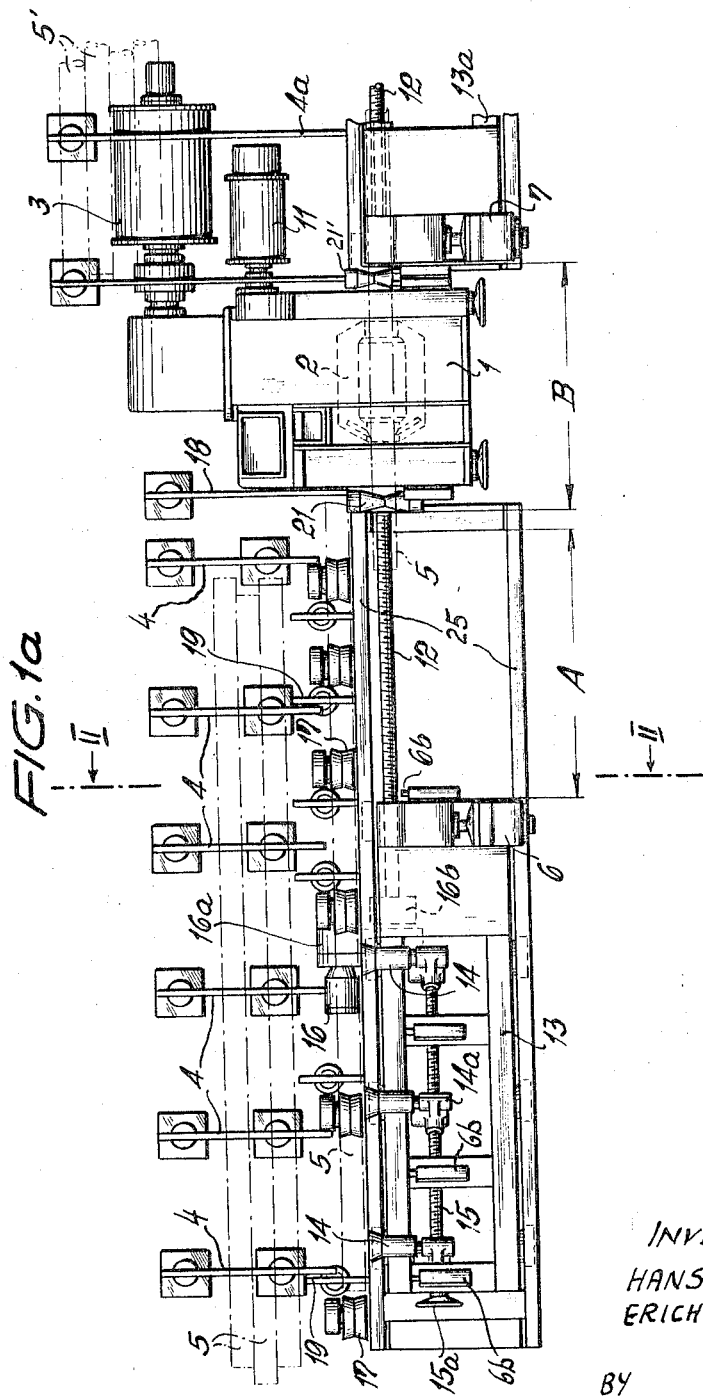

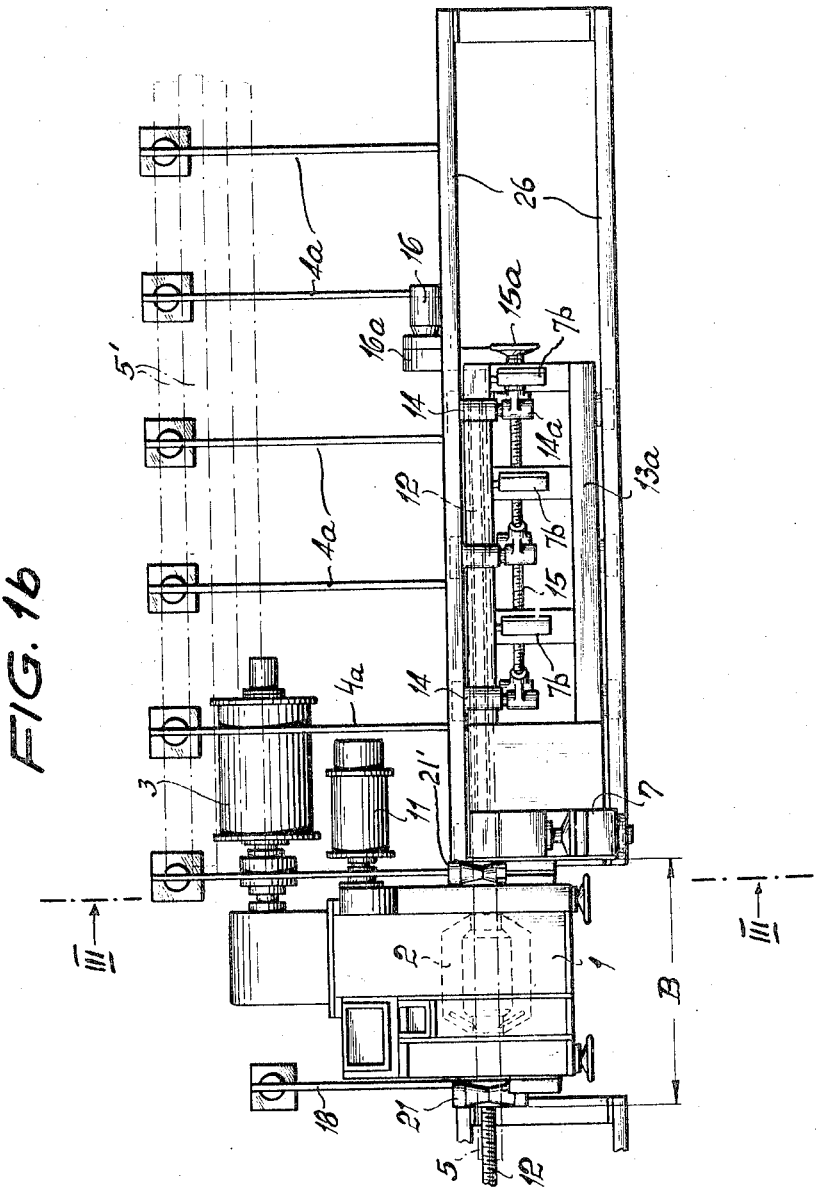

BY Michael J. Striker
their ATTORNEY

Jan. 10, 1967 H. PFEIFFER ET AL 3,296,902
MACHINE TOOL
Filed Sept. 1, 1964 4 Sheets-Sheet 4
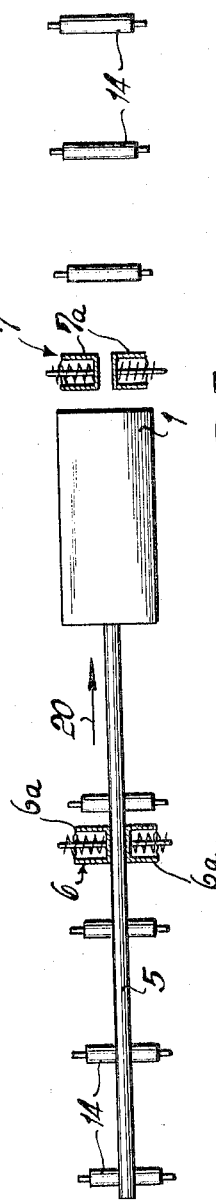
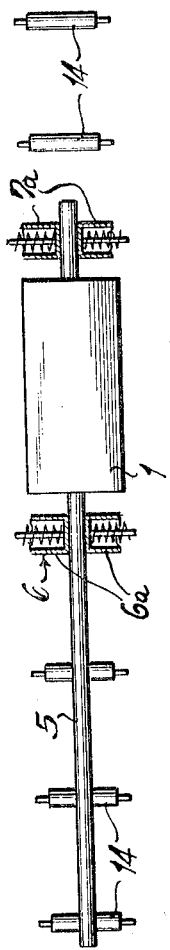
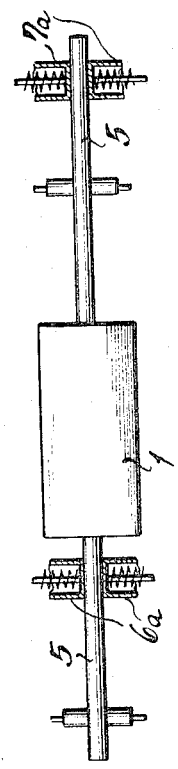
INVENTORS:
HANS PFEIFFER
ERICH KRAFFT
BY
Michael J. Striker
their ATTORNEY

United States Patent Office 3,296,902
Patented Jan. 10, 1967

3,296,902
MACHINE TOOL
Hans Pfeiffer, Solingen-Wald, and Erich Krafft, Solingen, Germany, assignors to Th. Kieserling & Albrecht, Solingen, Germany
Filed Sept. 1, 1964, Ser. No. 393,534
18 Claims. (Cl. 82—20)

The present invention relates to machine tools in general, and more particularly to improvements in apparatus which are especially suited for treatment of elongated tubular or solid rod stock of circular cross section. Still more particularly, the invention relates to apparatus wherein an elongated rod is being fed lengthwise through a shavings-removing machine including a revolving head which carries one or more cutters serving to provide the rod with a precision-finished peripheral surface of predetermined diameter.

In such precision treatment, it is customary to utilize reciprocable conveyors which feed the rod lengthwise through the revolving head and which are disposed at the opposite ends of the machine. Heavy and very long rods tend to flex and/or to vibrate unless they are supported at a plurality of points along the length thereof and, therefore, known apparatus for treatment of such heavy workpieces are normally provided with supports in the form of grates or the like to prop the leading and trailing portions in zones which are located ahead of and beyond the paths of the conveyors. In other words, such portions of the workpieces which extend above the path of a reciprocable conveyor are not propped at all because the supporting or propping devices do not extend into the pathway of the conveyors. On the other hand, even slight local overhanging or bending of a heavy elongated solid or tubular metallic bar will result in damage to its peripheral surface, i.e., in the formation of scratch marks and similar defects which necessitate aftertreatment and contribute considerably to the cost of the ultimate product. The danger of bending is particularly pronounced when the trailing end of the workpiece is sufficiently close to the first conveyor to be located beyond the range of the propping devices which are mounted ahead of the first conveyor because the trailing end then overhangs and causes corresponding flexing of such portions of the workpiece which are adjacent to the revolving head of the shavings-removing machine.

Additional problems arise when the conveyors suddenly release the workpiece in order to return to starting positions. Such sudden release of an otherwise insufficiently supported workpiece invariably results in localized flexing and produces scratch marks which must be removed in a subsequent operation. Also, the workpiece has a tendency to vibrate when the first conveyor is being moved back to its starting position because the revolving head is then much more likely to cause vibratory movements of the workpiece. In many conventional apparatus for shaving or peeling of elongated rod-like workpieces, the conveyors must perform very long strokes which also contributes to the formation of scratch marks because the workpiece remains disengaged from the one or the other conveyor while the conveyor moves back to its starting position.

Accordingly, it is an important object of the present invention to provide an improved apparatus for precision treatment of peripheral surfaces on solid or tubular workpieces and to construct the apparatus in such a way that the workpieces may be treated continuously even though the conveyors which feed them through the revolving head must perform very short working strokes whose length need not substantially exceed the overall length of the shavings-removing machine.

Another object of the present invention is to provide an apparatus of the just outlined characteristics wherein the workpiece is invariably supported along that portion thereof which overlaps the paths of the conveyors so that even a short length of the workpiece cannot overhang as a result of movement of conveyors to and from their starting positions.

A further object of the invention is to provide an apparatus for treating the peripheral surfaces of solid or tubular metallic rods or similar workpieces wherein the workpieces may be automatically aligned, fed and discharged in rapid sequence so that, once the operation is started, the personnel in charge need not initiate consecutive steps which are necessary to complete the treatment of an elongated workpiece.

Still another object of our invention is to provide an apparatus of the above outlined characteristics wherein at least some of the propping or supporting devices for the workpieces may share movements of the conveyors to make sure that the workpieces are supported not only by the conveyors themselves but also at such points which are located immediately ahead of and past the conveyors.

An additional object of our invention is to provide an apparatus of the above defined character wherein the supporting, aligning, feeding and other mechanisms may be readily adjusted for treatment of differently dimensioned workpieces, wherein the workpieces are held against uncontrolled vibratory movements, and wherein sudden disengagement from the conveyors cannot cause damage to the peripheral surfaces of such workpieces.

With the above objects in view, one feature of the present invention resides in the provision of an apparatus for removing material from peripheral surfaces of elongated workpieces, particularly for removing shavings from peripheral surfaces of solid cylindrical or tubular metallic workpieces by causing such workpieces to advance through a rotary shaving head. The apparatus comprises a shaving machine including cutter means arranged to treat the peripheral surface of a workpiece which is being fed lengthwise through the machine, a first and a second feed conveyor respectively located ahead of and past the machine (as seen in the direction of feed) and being movable toward and away from the machine to perform working strokes and to feed a workpiece through the machine while moving in the direction of feed, first supporting means adjacent to and located ahead of the first conveyor to support the trailing portion of a workpiece which is being fed by at least one of the conveyors, second supporting means adjacent to and located past the second conveyor for supporting that portion of the workpiece which has been fed past the second conveyor, and means for reciprocating the conveyors and the supporting means in and counter to the direction of feed.

It is preferred to connect the supporting means with the respective conveyors so that the drive which is used to reciprocate the conveyors simultaneously effects reciprocatory movements of the supporting means. Such supporting means may take the form of wheel-mounted carriages which are provided with vertically adjustable supporting or propping rolls for the workpieces. The conveyors comprise suitable clamping mechanisms which grip and feed the workpiece through the treating zone in response to feed strokes of the corresponding conveyors.

In accordance with another important feature of our invention, the overall length of the working and return strokes of the conveyors need not exceed substantially the overall length of the shaving machine; for example, the length of each stroke may at most equal the length of the shaving machine (as measured in the direction of feed)

plus twice the length of the clamping mechanism on the corresponding conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1a is a top plan view of the left-hand portion of an apparatus which is constructed and assembled in accordance with our invention;

FIG. 1b is a top plan view of the right-hand portion of the same apparatus, the parts being shown in positions they occupy at the start of an operation;

FIG. 2 is an enlarged transverse vertical section as seen in the direction of arrows from the line II—II of FIG. 1a;

FIG. 4 is a diagrammatic top plan view of certain components in positions they occupy when the first conveyor begins a working stroke;

FIG. 5 is a similar diagrammatic top plan view and illustrates the first conveyor in its foremost position; and FIG. 6 is a third diagrammatic top plan view showing the second conveyor in a position shortly before the end of its working stroke.

Figure 2:
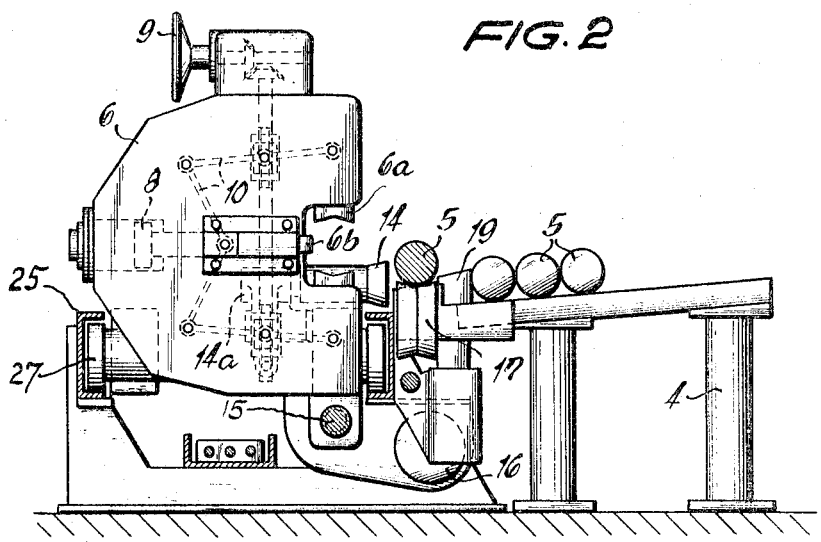

Referring to the drawings, FIGS. 1a and 1b illustrate an apparatus which is utilized for precision treatment of peripheral surfaces on solid or tubular rods or similar workpieces of circular outline. The apparatus comprises a centrally located shavings-removing machine 1 (hereinafter called shaving machine) which includes a rotary shaving or cutting head 2 defining a passage through which the stock passes in a direction from the left to the right, as viewed in FIGS. 1a and 1b. The head 2 is driven by a variable-speed electric motor 3. The shaving machine 1 is disposed between a first system of carriers or racks 4 which accommodate a supply of untreated workpieces 5, and a second system of carriers or racks 4a which accumulate finished workpieces 5'. The racks 4, 4a are laterally offset with reference to the head 2 and are inclined in opposite directions, i.e., the workpieces 5 on the racks 4 will tend to roll sideways and downwardly toward axial alignment with the head 2, and the workpieces 5' on the racks 4a will tend to roll sideways and downwardly to move away from axial alignment with the head 2.

Figure 3:
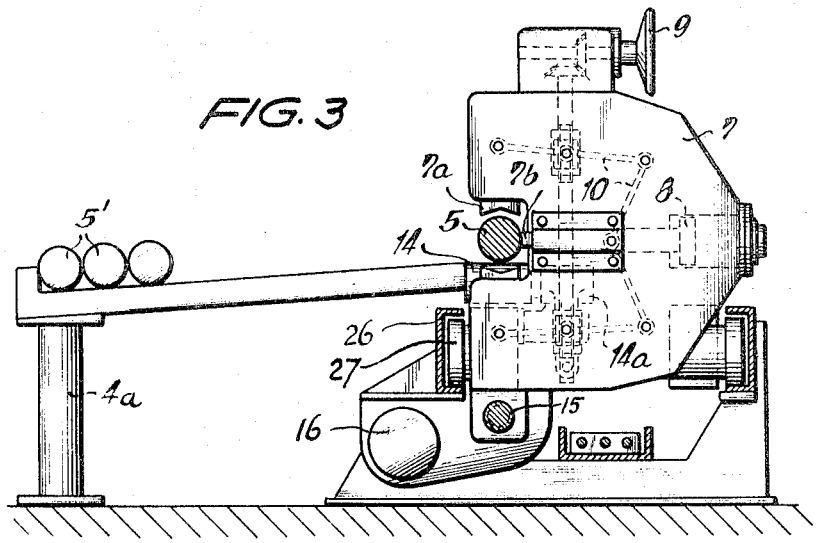
FIG. 3 is a similar enlarged transverse section as seen in the direction of arrows from the line III—III of FIG. 1b, with certain parts omitted.

The apparatus further comprises two advancing or feeding devices 6, 7 which are adjacent to the opposite axial ends of the machine 1 and serve to feed the stock through the head 2. The feeding device 6 is located at the intake end of the machine 1 and is reciprocable in the axial direction of the head 2 through distances A. The other feeding device 7 is located at the discharge end of the machine 1 and is also reciprocable axially of the head 2 through distances preferably corresponding to the distance A. For the sake of brevity, the devices 6 and 7 will be called conveyors and these conveyors are respectively provided with pairs of fluid-operated gripping or clamping jaws 6a, 7a, best shown in FIGS. 2 and 3, which engage the workpieces 5 and move them through the head 2 when the one and/or the other conveyor advances in a direction to the right, as viewed in FIGS. 1a and 1b. The actuating means for moving the jaws 6a, 7a between open end gripping positions include hydraulic cylinders 8 whose pistons are connected with linkages 10 serving to transmit motion to the respective pairs of jaws 6a, 7a. The linkages 10 are adjustable by hand wheels 9 so that the starting positions of the jaws 6a and 7a may be selected to be properly related to the diameters of the workpieces 5 and 5'.

The frame 25 of the conveyor 6 supports several fixed but adjustable stops 6b which arrest the workpieces 5 seriatim in positions of axial alignment with the head 2. Ejectors 7b, mounted on the frame 26 of the conveyor 7, are operated by hydraulic fluid and serve to roll finished workpieces 5' off the lower jaw 7a and sideways onto the grates 4a.

The conveyors 6, 7 are reciprocable by a drive including a variable-speed feed motor 11 which may rotate two elongated spindles 12 meshing with spindle nuts (not shown) on the corresponding conveyors. The spindle nuts may be held against rotation with the spindles by suitable hydraulic or electromagnetic clutches (not shown) which are operated by trips, limit switches, time-lag relays, or the like to initiate and/or terminate movements of the conveyors in a selected sequence. The frames 25, 26 are provided with rails which guide the conveyors in their movements toward and away from the machine 1.

The conveyor 6 is coupled to a reciprocable wheel-mounted carriage 13 which is located ahead of this conveyor and supports a series of vertically adjustable supporting rolls 14. These rolls serve to support the trailing portion of the foremost workpiece 5 while the workpiece is in axial alignment with the head 2. A similar wheel-mounted carriage 13a is coupled to and is located behind the conveyor 7 to support the leading portion of a partially or fully treated workpiece 5' while the workpiece is in axial alignment with the head 2. This second carriage 13a is also provided with vertically adjustable supporting rolls 14. The means for adjusting the rolls 14 on the carriages 13, 13a comprises two elongated spindles 15 which are rotatable by hand wheels 15a to move the corresponding rolls 14 to a level at which the respective workpiece 5 or 5' is properly supported in axial alignment with the head 2 and is thereby held against flexing. The rolls 14 are mounted on holders 14a which mesh with the corresponding spindles 15. Each holder 14a is pivotably secured to the frame of the corresponding carriage and is raised or lowered, depending on the direction in which the respective spindle 15 is rotated by its wheel 15a. The wheels of the carriages 13, 13a are indicated at 27.

The drive for the conveyors also comprises reversing means for rapidly returning the conveyors and their carriages 13, 13a, to the initial positions of FIGS. 1a and 1b. Such reversing means includes electric motors 16 which may drive the conveyors through the intermediary of transmissions 16a. The conveyors 6, 7 comprise spindle nuts and suitable clutches which cause such spindle nuts to mesh with and to rotate with reference to the spindles 12 when the motors 16 are running so that the conveyors and the associated carriages may rapidly return to starting positions. Thus, the motors 11 and 16 of the drive are used alternatively to move the conveyors and their carriages back and forth in a horizontal plane, i.e., in and counter to the direction of feed. When the conveyors are to perform feed strokes, the spindles 12 are driven by the motor 11 and the corresponding spindle nuts are held against rotation so that the respective conveyor moves in a direction to the right, as viewed in FIGS. 1a and 1b. When the conveyors are to perform return strokes, the spindles 12 are held against rotation and the transmissions 16a drive the corresponding spindle nuts to move the conveyors rapidly in a direction to the left, as viewed in FIGS. 1a or 1b.

The apparatus also comprises a locating rail 18 which is adjacent to the upstream end of the machine 1, and serves to arrest the foremost workpiece 5 on the racks 4 in a desired axial position. A system of driven rolls 17 serves to move the leading end of the foremost workpiece 5 on the racks 4 against the locating rail 18. Transfer devices 19 (see particularly FIG. 2) are used to move the foremost workpiece sideways from the racks 4 into the space between the jaws 6a so that the workpiece may be gripped prior to movement of the conveyor 6 in a direction toward the head 2. The transfer devices 19 have top faces which are inclined in the same direction as the racks 4, i.e., downwardly and toward an extension of the axis of the head 2.

The apparatus of our invention is operated as follows:

In the first step, the rolls 17 are driven by a suitable motor to advance the foremost workpiece 5 on the racks 4 axially and against the locating rail 18. The transfer devices 19 are then caused to move upwardly as viewed in FIG. 2, whereby the foremost workpiece 5 is lifted to a level slightly above the rolls 14 of the carriage 13 and is caused to roll sideways, i.e., downwardly as view in FIG. 1a, so that its leading portion enters the space between the jaws 6a. This workpiece is arrested by the stops 6b so that its axis constitutes an extension of the axis of the revolving head 2 which is driven by the motor 3. The machine 1 comprises a further guide roll 21 serving to support the leading end of that workpiece 5 which has been transferred onto the rolls 14 of the carriage 13, and the guide roll 21 is located ahead of the conveyor 6 which is then in the starting position of FIG. 1a, i.e., at a distance A from the machine 1. The distance A need not exceed the overal length B of the shaving machine plus twice the axial length of the gripping jaws 6a. In the drawings, the distance A exceeds only negligibly the distance B. The level of the rolls 14 on the carriage 13 has been adjusted by the left-hand wheel 15a in such a way that the workpiece 5 which rests thereon is located in a horizontal plane and in accurate axial alignment with the head 2.

The control system of the apparatus then causes the jaws 6a to grip the workpiece 5 and the motor 11 drives the left-hand spindle 12 so that the conveyor 6 begins to move in a direction to the right (see the arrow 20 in (FIG. 4) and the workpiece is fed lengthwise through the revolving head 2 which removes shavings and calibrates the workpiece while the later continues to advance onto the conveyor 7 which is then adjacent to the right-hand end of the machine 1, i.e., to a second guide roll 21′ which is mounted at the right-hand end of the machine.

When the leading end of the workpiece 5 enters the space between the jaws 7a of the conveyor 7, the control system of the apparatus actuates the corresponding cylinder 8 to move the jaws 7a toward each other and to clamp the workpiece. The conveyor 7 is then coupled to the right-hand spindle 12 which is rotated by the feed motor 11 so that the two conveyors may move simultaneously and together advance a portion of the workpiece through the head 2. When the conveyor 6 reaches the position of FIG. 5, its spindle nut is disconnected from the corresponding spindle 12 and the conveyor 7 takes over to advance the next portion of the workpiece through the shaving machine. Of course, the jaws 6a of the conveyor 6 release the workpiece at the time when this conveyor ceases to move toward the head 2 so that the workpiece is then grasped solely by the jaws 7a of the right-hand conveyor. Because the workpiece remains properly supported by the rolls of the carriage 13a, by the jaws 7a, by the rolls 21, 21′ at both sides of the head 2, and by the rolls 14 of the carriage 13, its surface is not scratched or otherwise damaged as a result of sudden disengagement of jaws 6a.

Since the length of strokes of the conveyors 6, 7 is comparatively short, the conveyor 6 may remain in the position of FIG. 5 while the conveyor 7 completes about two-thirds of its working stroke (see FIG. 6), whereupon the conveyor 6 rapidly returns to the position of FIG. 4 to reengage the workpiece and to begin a second working stroke (arrow 20). The conveyor 7 returns to the position of FIG. 4 before the conveyor 6 completes the second working stroke to be ready for reengagement with the workpiece not later than at the time the conveyor 6 reaches the position of FIG. 5. The same steps are then repeated as often as necessary, i.e., depending on the length of the workpieces. When the entire workpiece has been moved through and past the machine 1, the control system sends an impulse to open the jaws 7a and to actuate the ejectors 7b which transfer the finished workpiece 5′ sideways from the rolls 14 of the carriage 13a onto the racks 4a whereby the workpiece 5′ rolls along the racks and comes to a stop in response to engagement with the preceding finished workpiece.

It will be noted that a substantial length of each workpiece is supported at all times while the workpiece advances through the revolving head 2 so that the danger of flexing and resultant scratching of the surfaces on the workpiece is practically non-existent. Also, the workpiece is not likely to vibrate in response to rotation of the head 2 because its trailing end is separated from the machine 1 by a substantial length which is accurately supported on a series of rolls so that the vibrations cannot be transmitted to the trailing end even if the latter happens to overhang, i.e., even if it extends beyond the rearmost roll 14 on the front carriage 13.

The gripping action of the jaws 6a, 7a also contributes to an elimination of vibrations.

Because the strokes of the conveyors 6, 7 are rather short, the spindles 12 are also short which results in substantial savings in the initial cost of the apparatus and insures more accurate treatment of workpieces. It is to be noted that the spindles 12 and the spindle nuts which mesh therewith may be replaced by racks and pinions without departing from the scope of our invention. Also, while it is possible to make the carriages 13, 13a independent of the conveyors 6, 7 and to provide separate drives which reciprocate the carriages in synchronism with the corresponding conveyors, the solution which is shown in the drawings is normally preferred because the motors 11 and 16 are fully capable of reciprocating the conveyors together with the associated carriages. The rolls 14 of the carriages 13, 13a cooperate with the guide rolls 21, 21′ of the machine 1 to continuously support such a length of a workpiece which suffices to prevent flexing, vibrations and other undesirable influences which could produce scratches or other defects on the treated stock.

Without further analysis, the foregoing will so fully reveal the gist of the present invention that others can, by applying current knowledge, readily adapt it for various applications without omitting features which fairly constitute essential characteristics of the generic and specific aspects of this invention, and therefore, such adaptations should and are intended to be comprehended within the meaning and range of equivalence of the following claims.

What is claimed as new and desired to be secured by Letters Patent is:

1. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

2. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed and each conveyor comprising a clamping mechanism arranged to grip a workpiece when the respective conveyor performs a working stroke, the overall length of such working strokes approximating the length of said shaving machine as measured in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

3. An apparatus as set forth in claim 2, wherein the length of said working strokes at most equals the length of said machine plus twice the length of the clamping mechanism on the respective conveyor.

4. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means connected to and located ahead of said first conveyor to support the trailing portion of a workpiece which is being fed by at least one of said conveyors; second supporting means connected to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and means for reciprocating said conveyors and the corresponding supporting means in and counter to the direction of feed.

5. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, each of said supporting means comprising a carriage, a plurality of longitudinally aligned vertically adjustable rolls on said carriage, and adjusting means for moving said rolls in requisite supporting engagement with the workpiece; and means for reciprocating said conveyors and said supporting means in and counter to the direction of feed.

6. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and drive means for reciprocating said conveyors and said supporting means in and counter to the direction of feed, said drive means comprising first motor means for moving said conveyors and said supporting means in the direction of feed at a first speed, and second motor means for moving said conveyors and said supporting means counter to the direction of feed at a second speed exceeding said first speed.

7. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first and second guide means provided on said machine at the opposite sides of said cutter means and respectively adjacent to said first and second conveyors for guiding the workpiece which is being fed through said machine; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

8. An apparatus as set forth in claim 7, wherein said conveyors are arranged to reciprocate in a horizontal plane and wherein said guide means are rolls mounted at the ends of said shaving machine.

9. An apparatus for removing material from peripheral surfaces of elongated workpieces particularly for shaving heavy elongated metallic workpieces of circular cross section, comprising a shaving machine including a rotary shaving head arranged to treat the peripheral surface of a workpiece which is being fed axially therethrough, and motor means for driving said head; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

10. An apparatus as set forth in claim 9, further comprising first rack means for supporting a supply of untreated workpieces in a zone which is laterally adjacent to said first conveyor and to said first supporting means, and second rack means for accumulating a supply of treated workpieces in a zone which is laterally adjacent to said second conveyor and to said second supporting means.

11. An apparatus as set forth in claim 10, further comprising transfer means for moving untreated workpieces sideways from said first rack means onto said first conveyor and onto said first supporting means.

12. An apparatus as set forth in claim 11, further comprising fixed stop means adjacent to said first supporting means for arresting a workpiece which moves sideways in a position of axial alignment with said shaving head.

13. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor, at least one of said supporting means comprising a plurality of supporting members distributed in the longitudinal direction of and arranged to support longtudinally spaced portions of a workpiece to prevent flexing of the workpiece; and mechanical drive means for reciprocating said conveyors and said supporting means in and counter to the direction of feed.

14. In an apparatus for removing material from peripheral surfaces of elongated workpieces, in combination, a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; supporting means adjacent to and located ahead of said first conveyor to support the trailing portion of a workpiece which is being fed by at least one of said conveyors, said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

15. In an apparatus for removing material from peripheral surfaces of elongated workpieces, in combination, a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; supporting means adjacent to and located past said second conveyor for supporting that portion of a workpiece which has been fed past said second conveyor, said supporting means comprising a plurality of supporting members distributed in the longitudinal direction of and arranged to support longitudinally spaced portions of a workpiece to prevent flexing of the workpiece; and means for reciprocating said conveyors and said supporting means in and counter to the direction of feed.

16. An apparatus for removing material from peripheral surfaces of elongated workpieces, comprising a shaving machine including cutter means arranged to treat the peripheral surface of a workpiece which is being fed lengthwise through said machine, said cutter means comprising a rotary shaving head whose axis is parallel to the directioin of feed; a first and a second feed conveyor respectively located ahead of and past said machine as seen in the direction of feed, said conveyors being movable toward and away from said machine to perform working strokes and to feed a workpiece through said machine while moving in the direction of feed; first supporting means connected to and located ahead of said first conveyor to support the trailing portion of a workpiece which is being fed by at least one of said conveyors; second supporting means connected to and located past said second conveyor for supporting that portion of a workpiece which has been fed past said second conveyor, each of said supporting means comprising a wheel-mounted carriage and a plurality of supporting rolls mounted on the respective carriage to prop the adjacent portion of a workpiece and to maintain such workpiece in axial alignment with said shaving head; and means for reciprocating said conveyors and the corresponding supporting means in and counter to the direction of feed.

17. An apparatus for removing material from peripheral surfaces of elongated workpieces, particularly for shaving heavy elongated metallic workpieces of circular cross section, comprising a shaving machine including a rotary shaving head arranged to treat the peripheral surface of a workpiece which is being fed axially therethrough, and motor means for driving said head; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor; means for reciprocating said conveyors and said supporting means in and counter to the direction of feed; first rack means for supporting a supply of untreated workpieces in a zone which is laterally adjacent to said first conveyor and to said first supporting means; second rack means for accumulating a supply of treated workpieces in a zone which is laterally adjacent to said second conveyor and to said second supporting means; transfer means for moving untreated workpieces sideways from said first rack means onto said first conveyor and onto said first supporting means; fixed locating means provided on said first rack means adjacent to said shaving machine; and means for moving untreated workpieces lengthwise into abutment with said locating means.

18. An apparatus for removing material from peripheral surfaces of elongated workpieces, comprising a shaving machine including cutter means arranged to treat the peripheral surface of a workpiece which is being fed lengthwise through said machine; a first and a second feed conveyor respectively located ahead of and past said machine as seen in the direction of feed, said conveyors being movable toward and away from said machine to perform working strokes and to feed a workpiece through said machine while moving in the direction of feed; first supporting means adjacent to and located ahead of said first conveyor to support the trailing portion of a workpiece which is being fed by at least one of said conveyors; second supporting means adjacent to and located past said second conveyor for supporting that portion of a workpiece which has been fed past said second conveyor; and mechanical drive means for reciprocating said conveyors and said supporting means in and counter to the direction of feed, said drive means comprising elongated spindles parallel with the direction of feed, first motor means for rotating said spindles, spindle nuts mounted on said conveyors and arranged to mesh with the corresponding spindles in selected phases of operation, and second motor means for rotating said spindle nuts.

References Cited by the Examiner

UNITED STATES PATENTS

| | | | |
|---|---|---|---|
| 1,669,264 | 5/1928 | Reis | 82—20 |
| 2,201,173 | 5/1940 | Hanitz | 82—20 X |
| 2,427,322 | 9/1947 | Darner | 82—20 |
| 2,575,422 | 11/1951 | Laulainen. | |

FOREIGN PATENTS

| | | |
|---|---|---|
| 905,877 | 4/1945 | France. |
| 826,189 | 12/1959 | Great Britain. |

WILLIAM W. DYER, JR., *Primary Examiner.*

LEONIDAS VLACHOS, *Examiner.*